Jan. 30, 1934. W. A. KNOOP Re. 19,067

SYNCHRONIZING SYSTEM

Original Filed April 13, 1929 6 Sheets-Sheet 1

FIG. 1-A.

INVENTOR
W. A. KNOOP
BY
J. W. Schmied
ATTORNEY

Jan. 30, 1934. W. A. KNOOP Re. 19,067
SYNCHRONIZING SYSTEM
Original Filed April 13, 1929 6 Sheets-Sheet 2
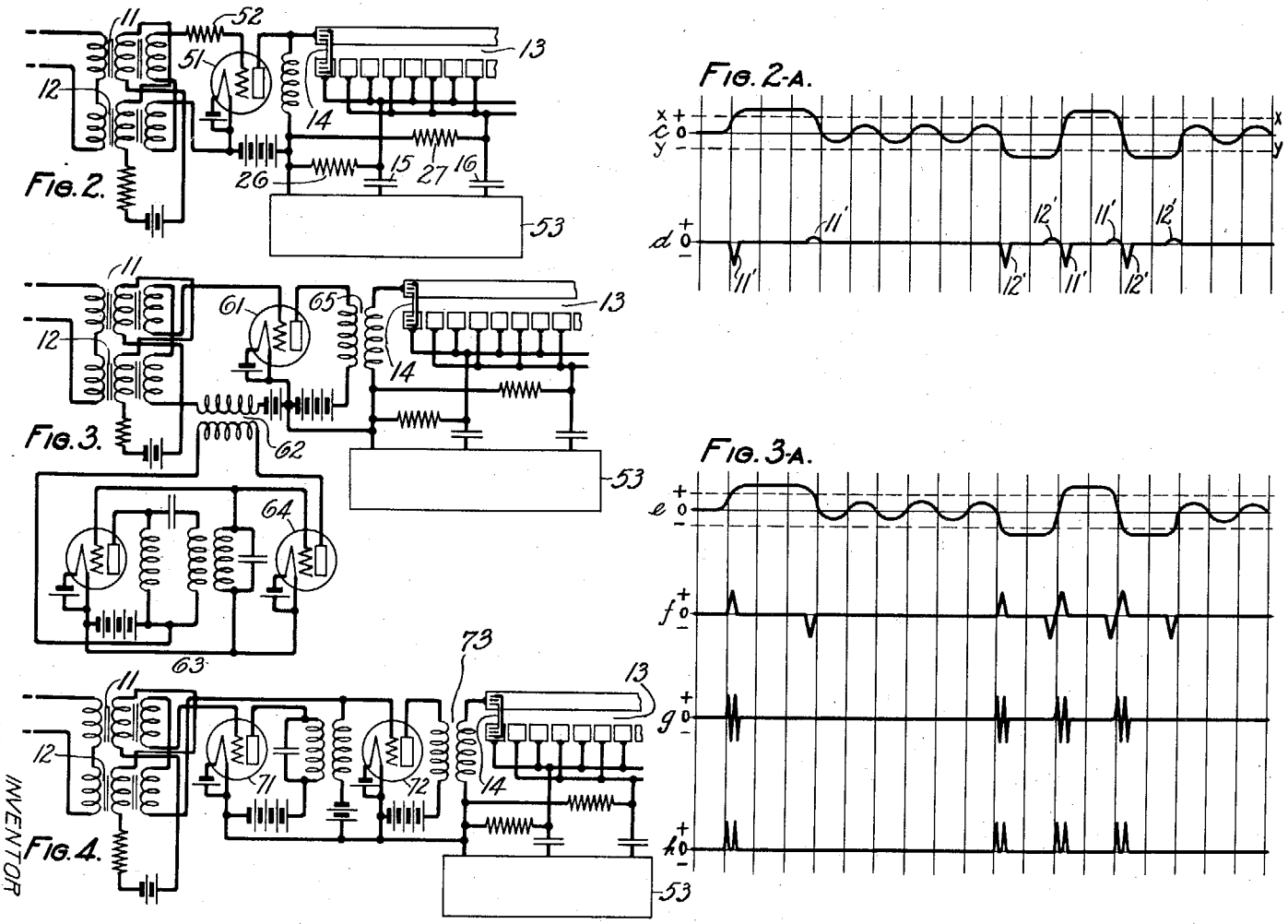
INVENTOR
W. A. KNOOP
BY J. W. Schmied
ATTORNEY Jan. 30, 1934. W. A. KNOOP Re. 19,067

SYNCHRONIZING SYSTEM

Original Filed April 13, 1929 6 Sheets-Sheet 3

INVENTOR
W. A. KNOOP
BY J. W. Schmied
ATTORNEY

Jan. 30, 1934. W. A. KNOOP Re. 19,067

SYNCHRONIZING SYSTEM

Original Filed April 13, 1929 6 Sheets-Sheet 4

INVENTOR
W. A. KNOOP
BY J. W. Schmied
ATTORNEY

INVENTOR
W. A. KNOOP
BY J. W. Schmied
ATTORNEY

SYNCHRONIZING SYSTEM
Original Filed April 13, 1929 6 Sheets-Sheet 6
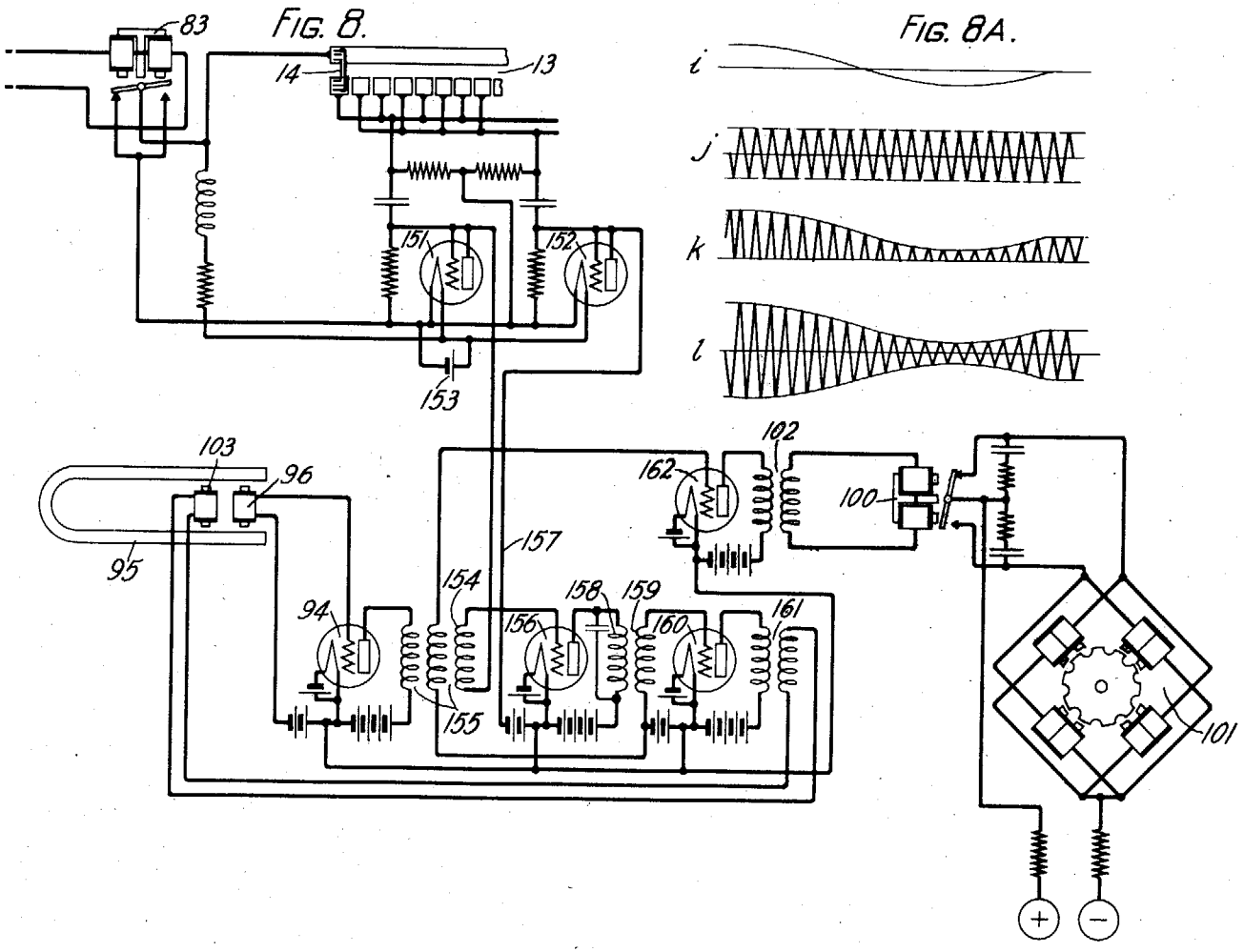
INVENTOR
W. A. KNOOP
BY
J. W. Schmied
ATTORNEY Reissued Jan. 30, 1934

Re. 19,067

UNITED STATES PATENT OFFICE 19,067

SYNCHRONIZING SYSTEM

William A. Knoop, Hempstead, N. Y., assignor to Bell Telephone Laboratories, Incorporated, New York, N. Y., a corporation of New York Original No. 1,848,180, dated March 8, 1932, Serial No. 354,954, April 13, 1929, and in Great Britain May 19, 1928. Application for reissue April 6, 1933. Serial No. 664,747

17 Claims. (Cl. 178—53)

This invention relates to synchronous communication systems and particularly to extremely high speed printing telegraph systems.

A general object of the invention is to maintain in a positive manner and with great exactness synchronism between transmitting and receiving apparatus at separate points.

A more specific object is to maintain synchronism by a continuous electrical correction arrangement wherein the correcting pulses neutralize themselves when the system is in synchronism, but are employed when a departure from synchronism occurs, to vary the impedance of the operating circuit for a vibrating fork to thereby cause an increase or decrease, as desired, in the frequency of the fork.

A feature of the invention is the use of a pair of magnetically biased transformers for receiving the incoming signal waves whereby all received waves regardless of their polarity are each repeated as two short voltage impulses of opposite polarities, the impulse occurring at the beginning of each wave being of one polarity and that occurring at the end being of the other polarity.

Another feature of the invention is the use of a vacuum tube vibratory fork for driving a rotary distributor motor whereby the fork frequency when it becomes greater or less than that used with the transmitting apparatus is varied in response to slight variations in currents caused only by the received incoming signal waves. This feature assures positive action of the synchronizing means whereby production of pulse correcting pulses due to interference or irregular signals is largely eliminated.

Heretofore, in synchronous telegraphy it has been the general practice to utilize receiving synchronous apparatus adjusted to run at a speed slightly different from that of the transmitting apparatus and to correct for the difference in speed between the two by stepping the distributor brushes backward or forward independently of the driving motor whenever the angular shift between the brush and the motor shafts exceeded a certain amount. Another practice has been to run the receiving apparatus at one of two speeds which are respectively slower and faster than that of the associated transmitting apparatus and to shift from one speed to the other to maintain approximate synchronism with the transmitter. The phase wander inherent with the above methods prohibits their use in extremely high speed signaling systems when the signal impulse waves become very short and it then becomes desirable to hold the receiving distributor at substantially the same constant speed as the transmitting distributor. Systems for obtaining this result have been proposed heretofore but they have been subject to the inherent fault that they have depended on correcting impulses received over a distributor segment or segments to operate a correcting relay or other relatively insensitive apparatus. Even the best mechanical relays at present available are only responsive to relatively large impulses compared to those required to control a vacuum tube and therefore it is necessary that the correcting segments in a system of the above type move through a considerable arc in each direction before the contact area between brush and segment becomes large enough to pass sufficient current to operate a relay. This involves an excessive phase displacement before a correcting impulse is produced Therefore, various systems employing vacuum tubes have been proposed whereby the whole or a part of a correcting pulse is passed through a vacuum tube amplifier to the vibrating fork relay. In the system disclosed in U. S. Patent 1,747,248, granted to W. A. Knoop on Feb. 18, 1930, wherein vacuum tubes are employed, the distributor motor is operated by an alternating current relay under the control of a vacuum tube oscillating circuit and any departure from synchronism between the motors associated with the transmitting and receiving apparatus will produce a change in the impedance of the oscillating circuit. The vacuum tube oscillating circuit is extremely sensitive and therefore responsive to interference or slight irregularities in the correcting pulses which set up false operation of the motor relay.

An object of this invention is to overcome these difficulties and is attained, in one embodiment, by employing at the receiving end of a line or section of a line a fork instead of a vacuum tube oscillator.

My U. S. Patent No. 1,747,248 issued February 18, 1930, discloses in a general way certain subject matter claimed in this application in that it states that a vacuum tube regenerative tuning fork may be satisfactorily used instead of the oscillator circuit shown in the patent.

In order to eliminate difficulties due to dirty relay contacts, bias, etc., the impulse relay is replaced by a pair of transformers magnetically biased in opposite directions and adapted to repeat the incoming signal waves as a series of high voltage impulses. The secondary windings of the transformers are connected in series, but reversed with respect to each other in order to obtain a positive impulse at the beginning of a signal wave regardless of whether the signal is positive or negative. These impulses are each impressed over two correcting segments of a rotary distributor on to the grids of two vacuum tube rectifiers and the rectified impulses are each in turn impressed on two differentially connected vacuum tube amplifiers so that any difference in their output currents such as occurs when there is a small departure from synchronism, may be utilized, through two opposing windings on a magnetically biased variable reactance coil to alter the impedance of an alternating current circuit which regulates the frequency of a tuned fork.

In the drawings, Fig. 1 shows the complete correcting system of the invention wherein only the positive voltage impulses are utilized for correction. Fig. 1A represents by curves *a* and *b* the input current and the output voltage, respectively, of the pair of transformers shown in Fig. 1.

Fig. 2 is a modification of Fig. 1 wherein the negative voltage impulses are utilized for correction. Fig. 2A shows the input current and the output voltage by curves *c* and *d* respectively, of the pair of transformers shown in Fig. 2.

Fig. 3 is another modification of Fig. 1 wherein a vacuum tube oscillating circuit furnishes high frequency current to a negative "C" modulating tube, the voltage impulses of positive polarity being utilized to permit the high frequency current to produce the correcting pulses.

Fig. 3A shows in curves *e* and *f* the input current and output voltage, respectively, of the pair of input transformers shown in Fig. 3, and curve *g*, a series of current oscillations occurring during the intervals of effective voltage impulses shown in curve *f*, and curve *h*, the rectified current oscillations of curve *g* effective for the necessary correction.

Fig. 4 is a modification of Fig. 3 wherein the modulating tube serves also as an oscillator-amplifier.

Figure 1:
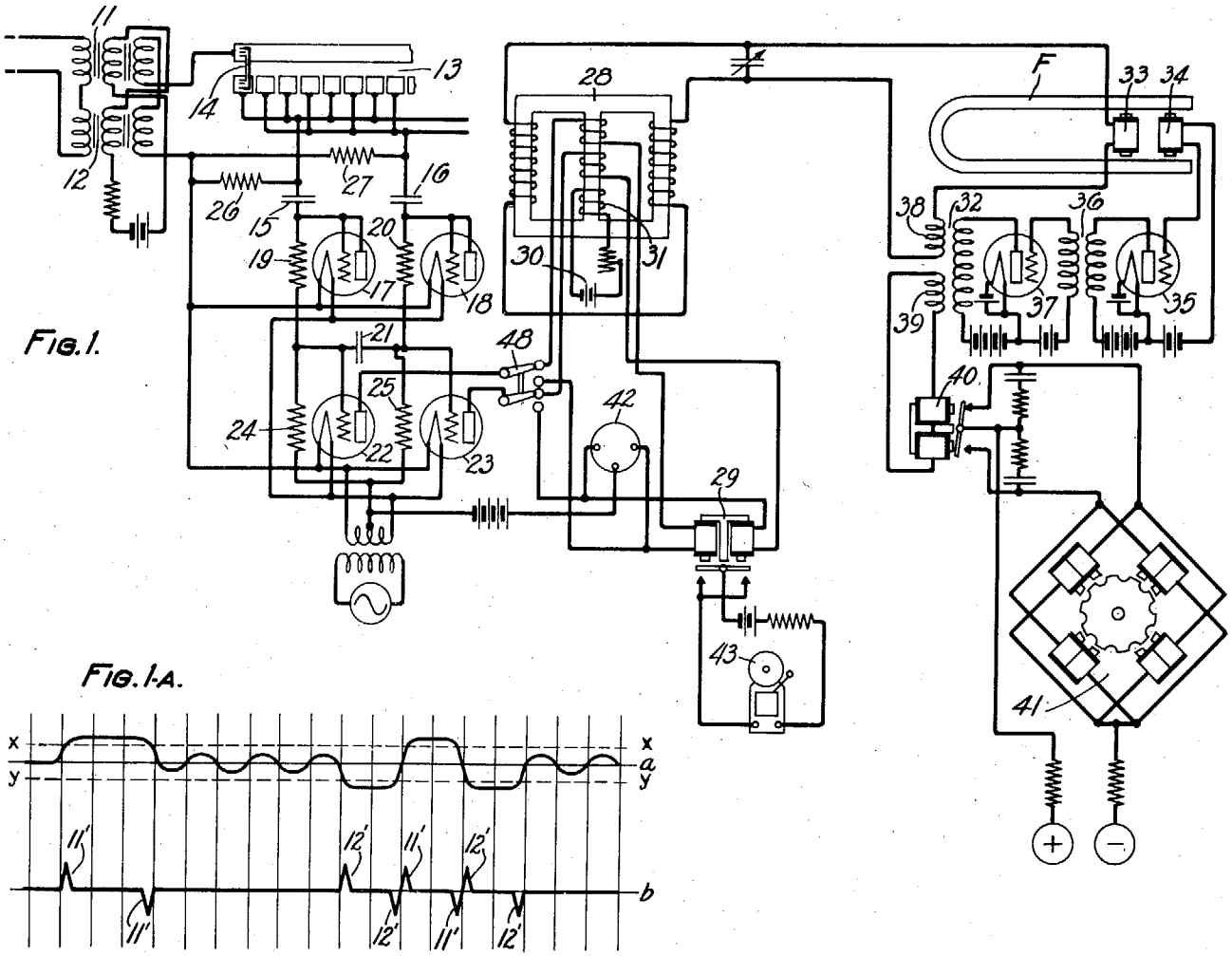
Figure 5:
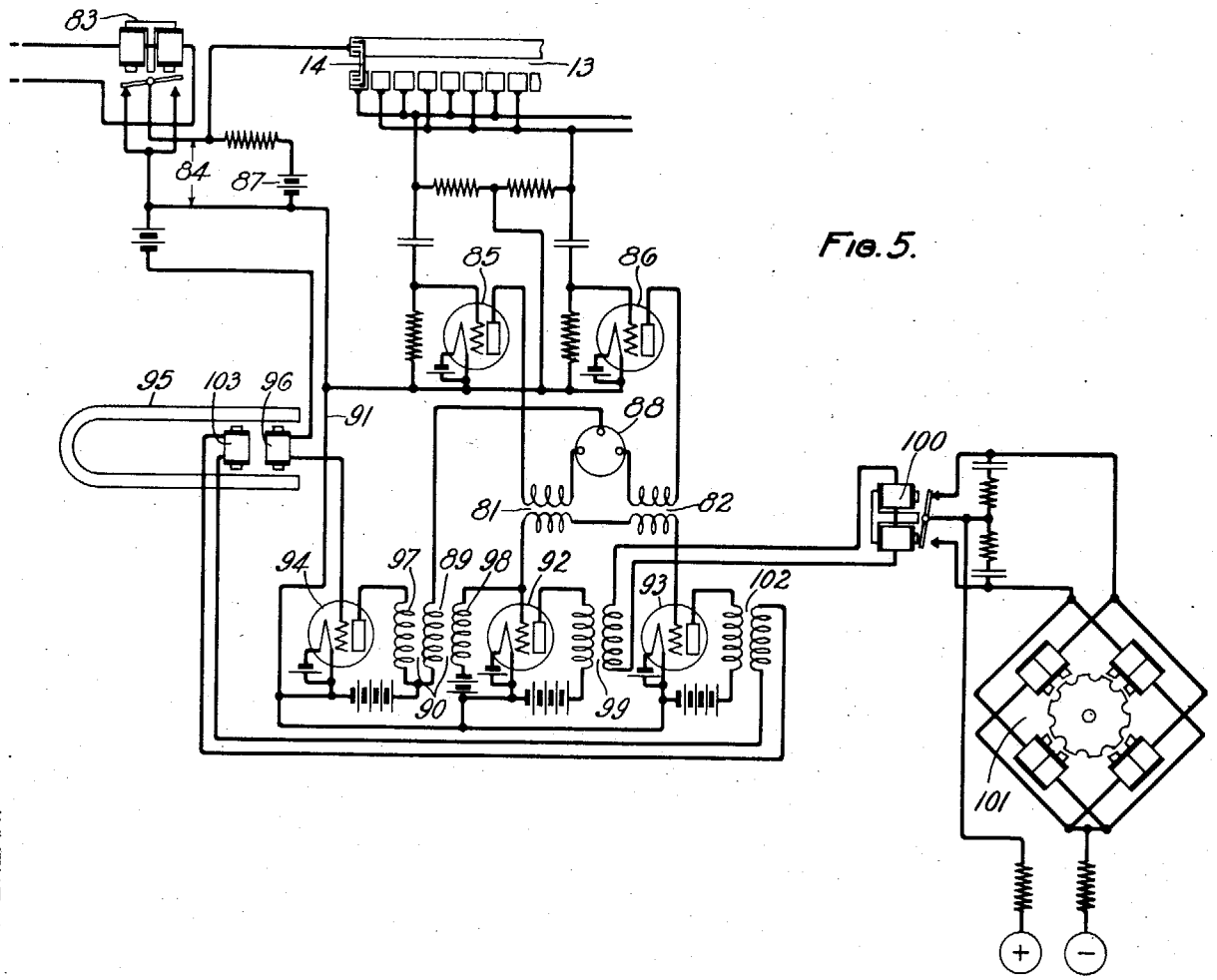

Fig. 5 is a modification of Fig. 1 wherein phase modulation for producing correcting pulses is employed. This is effected by means of two correcting vacuum tubes, the output circuits of which are inductively connected in the input circuit of a vacuum tube which controls the feedback circuit to the vibrating fork. In this arrangement the voltages set up by the vibrating fork are impressed equally on the plate circuits of the correcting tubes.

Figure 6:
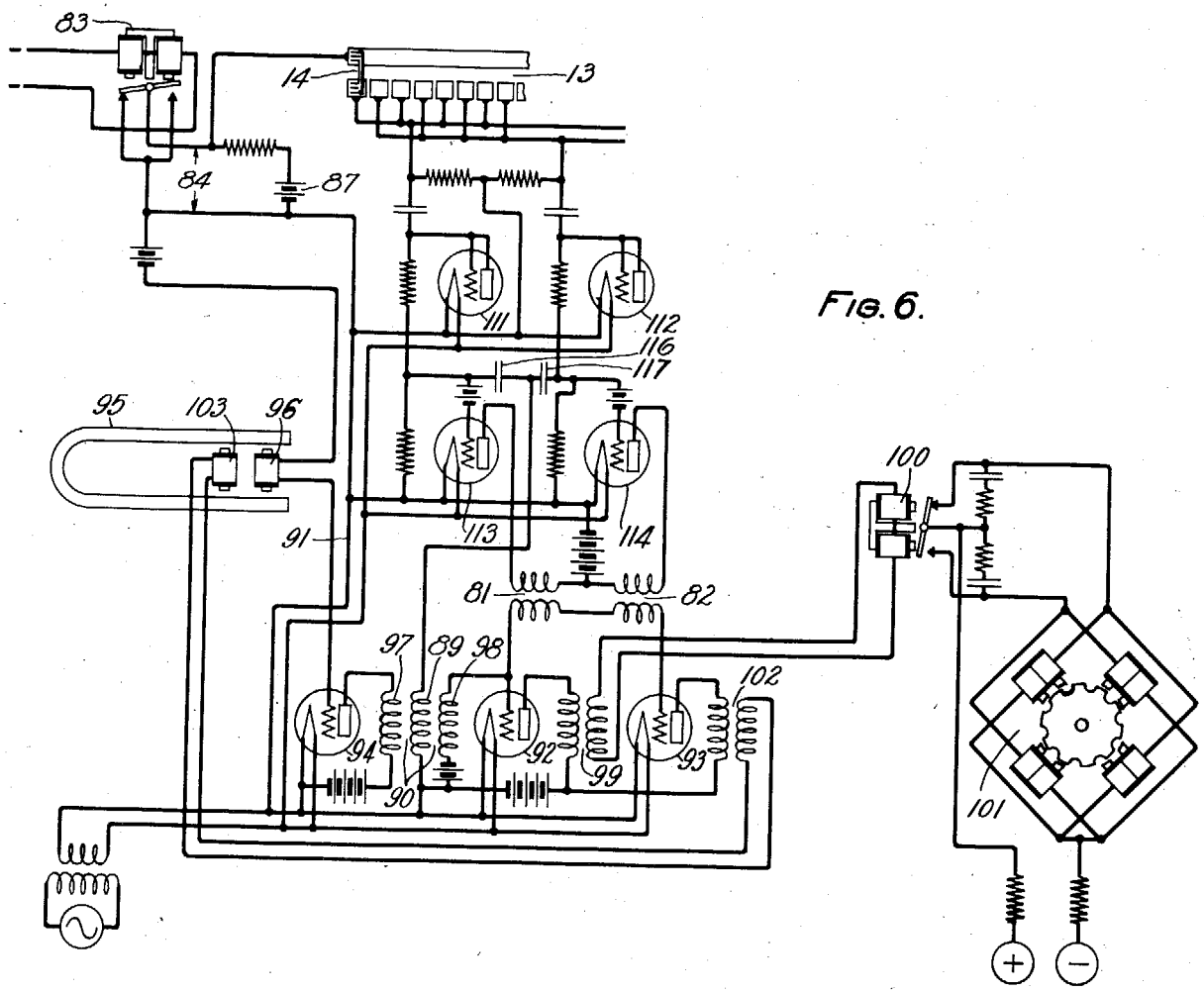

Fig. 6 is a modification of Fig. 5 wherein voltages set up by the vibrating fork are equally impressed on the grids of the correcting tubes.

Figure 7:
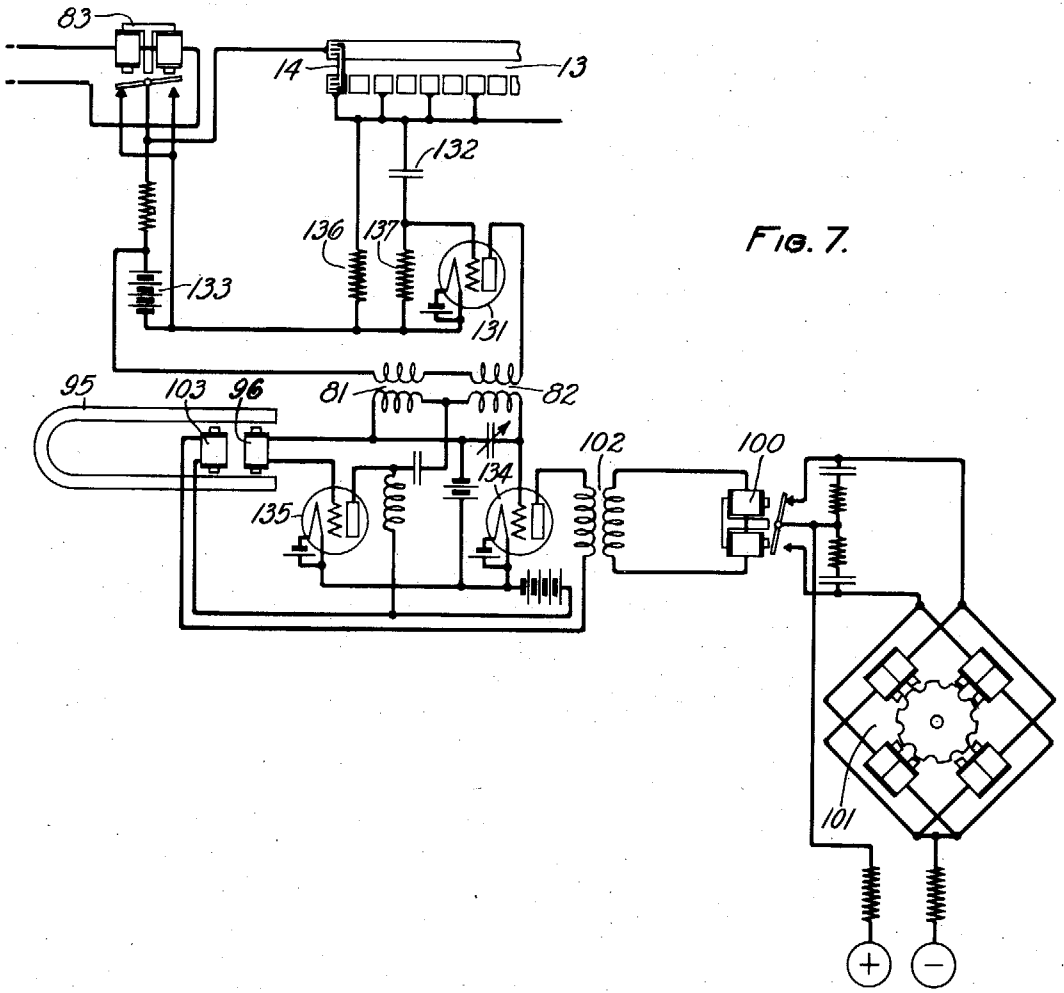

Fig. 7 is another modification of Fig. 1 wherein one set of correcting segments and one correcting vacuum tube are employed to maintain the vibrating fork in synchronism.

Fig. 8 is another modification of Fig. 1 wherein modulation is effected by a vacuum tube. Fig. 8A represents in curves *i*, *j*, *k* and *l* the operation of the arrangement of Fig. 8.

Like characters represent like parts.

In Fig. 1 a pair of transformers 11 and 12 with high permeability cores of the type disclosed in a copending application of E. T. Burton, Serial No. 280,709, filed May 26, 1928 are employed in place of the relay generally used for repeating incoming signal waves from a receiving amplifier (not shown) to the correction circuit. These transformers are equipped with core material, such as permalloy, which have a high permeability at low magnetizing forces and have a magnetic circuit which becomes overloaded at low amplitudes of the signaling current. Therefore a signal wave of slowly varying intensities when received in the primary windings produces in the secondary windings, a wave of short, discrete impulses which occur while the magnetizing force is passing through values slightly above or slightly below zero. By biasing the transformers magnetically in opposite directions the intervals in which the sharp impulses occur are shifted to the higher values of magnetic force so that two impulses are produced during the rise and fall of a single wave on either the positive or negative side of the zero value. The impulses so produced by each signal wave are of opposite polarity and are produced in one or the other of the secondary windings depending upon the polarity or direction of the signal wave, that is, those caused by a positive wave are produced in one winding and those caused by a negative wave are produced in the other winding. The secondary windings are connected in series, but reversed with respect to each other in order to invert the impulses in one winding, thereby obtaining a positive impulse at the beginning and a negative impulse at the end of each signal wave regardless of the polarity of the wave. These impulses are each impressed over two segments of a rotary correcting distributor 13, two segments being provided for each impulse interval of a transmitted signal wave. The correction segments are each half the length of a signal impulse. When the correcting distributor is in synchronous phase with the transmitting distributor at a distant station (not shown), brush 14 of the correcting distributor is passing between a pair of correction segments at the time an impulse occurs in either of the secondary windings, so that each segment of a pair receives an equal part of the secondary impulse. The equal parts of an impulse are respectively impressed through condensers 15 and 16 on to the anodes of two vacuum tube rectifiers 17 and 18 as shown, wherein the negative impulses are blocked but the positive impulses cause electrons to flow from the cathodes to the anodes and thence to the lower plates of the condensers. When the positive charges are removed from the upper plates of condensers 15 and 16 the negative charges previously held on the lower plates are released and flow through high resistances 19 and 20 respectively to opposite plates of a condenser 21 which acts as a storing device. If the correcting distributor is slightly out of phase with the transmitting distributor each impulse will be impressed in unequal parts on the anodes of rectifiers 17 and 18 which will result in one of the rectifiers applying larger impulses to the condenser 21 than the other, thereby causing a difference of potential across the condenser 21. The opposite sides of condenser 21 are connected to the grids of vacuum tube amplifiers 22 and 23 respectively, and any difference in the potentials across the condenser will cause unequal currents in the plate circuits of the amplifiers. If however, the correcting distributor is operating substantially in phase with the transmitting distributor but due to signal distortion an occasional short series of false correction impulses is applied to one of the tubes 17 or 18, these impulses will have little or no effect on the tubes 22, and 23 because of the delaying effect of resistances 19 and 20 and the storage condenser 21. In other words, there must be a continued, though slight, departure from synchronism of the correcting distributor before a correcting tendency is produced. This tends to stabilize the system and prevent objectionable hunting which might occur if the correction system responded to momentarily unequal impulses from the transmitting distributor. Resistances 24 and 25 which are of high values with respect to the values of resistances 19 and 20, provide leak paths for condenser 21. Resistances 26 and 27 which are of relatively low values, provide leak paths for the relatively large capacity condensers 15 and 16.

The plate circuits of amplifiers 22 and 23 respectively extend through two windings of a variable reactance coil 28 and two windings of a polarized relay 29, in series, the windings of the coil being connected in opposite relation so that when the correcting distributor is in phase with the transmitting distributor any magnetic fields set up by the plate currents of equal values will cancel each other.

The variable reactance coil 28 comprises a core constructed of a magnetic material such as a high permeability nickel-iron alloy, the permeability of which varies with the magnetizing force, and which has a low coercive force in order that slight changes in the magnetizing force may produce corresponding changes in the flux density. The core is magnetically biased from a current source 30 through the winding 31 so that the flux density is maintained at such a mean average value that small changes in the magnetizing force will produce large and approximately proportional changes in the permeability. In other words, it is desired to work on the steepest part of the permeability curve. The core is equipped with a fourth winding connected in the circuit extending through a secondary winding 38 on transformer 32 and the winding of magnet 33. This circuit forms a part of the circuit of a vacuum tube tuning fork circuit arrangement of the type disclosed in a copending application of A. M. Curtis Serial No. 237,346, filed December 2, 1927, wherein a pick-up magnet 34 is arranged in the magnetic field of the vibrating fork F and is adapted to impress the frequency of the fork on a pick-up vacuum tube 35, transformer 36, a fork drive vacuum tube 37 and the primary winding of transformer 32, in series. The output of vacuum tube 37 is impressed on winding 38 of transformer 32, which causes the fork frequency current to flow through the winding of magnet 33 and the fourth winding of coil 28, the current flowing through magnet 33 being employed to drive the vibrating fork F. Another secondary winding 39 on transformer 32 receives the output of vacuum tube 37 to operate the motor relay 40 whereby an alternating current motor 41 of the La Cour phonic wheel type is operated to drive the correcting distributor.

The type of variable reactance coil used in the present invention preferably has a shell type core. On the two outside legs of the core is mounted the alternating current winding of the fork drive circuit and on the middle leg are mounted the two modulating windings of the plate circuits of amplifiers 22 and 23, and the biasing winding 31. With this form of reactance coil, practically no alternating current is induced in either the biasing or modulating windings. The alternating current flux circulates around the two outside legs and the biasing current flux flows from the middle leg and returns through the outside legs, in parallel. The biasing current thus saturates the outside legs and thereby reduces their permeability and therefore the reactance of their windings to the alternating current.

When unequal currents, due to correction impulses received when the correcting distributor loses phase, flow in the plate circuits of vacuum tubes 22 and 23, the operating impedance of the coil 28 to the alternating current in the fourth winding is increased or decreased depending on whether the correcting distributor is running slow or fast. This changes the reactance of the variable reactance coil and in turn changes the power fed to maintain the fork in vibration. This causes the amplitude of vibration of the fork to change and the fork is so adjusted that a change of amplitude causes a change of damping. The damping in turn affects the fork frequency and there is then a corresponding change in the motor speed.

Visible and audible means are provided by meter 42 and alarm bell 43 respectively, for informing an attendant at the receiving station when a loss of synchronous phase occurs. When unequal currents are produced in the plate circuits of tubes 22 and 23, relay 29 which is of the differential type, operates to complete the circuit extending to bell 43 which sounds the alarm. Likewise the unequal plate currents will cause a needle in meter 42 to move to either one side or the other of its normal position to indicate the direction and amount of the loss of phase. Means are also provided for obtaining a meter indication of a loss of phase without effecting correction therefor or sounding the alarm 43 by use of switch 48 which when placed in its alternate position disconnects coil 28 and relay 29.

In Fig. 1—A is a graphic representation of the operation of transformers 11 and 12 in response to an incoming signal wave illustrated by curve *a*. The transformers are magnetically biased to be non-responsive to the signal wave until the current reaches intensities indicated in the drawings by broken lines *x—x* and *y—y*. Thus only signal waves above a certain intensity will be effective to produce voltage impulses in the secondary windings. Curve *b* shows the voltage impulses produced in the secondary windings every time the signal wave passes through the intensities indicated by broken lines *x—x* and *y—y*. Ordinarily when the secondary windings are connected in the same direction with respect to each other, the impulse of positive polarity will be produced for every rise in intensity of a positive signal wave and for every drop in intensity of a negative signal wave, and a negative impulse is produced for every drop in intensity of the positive signal wave and every rise in intensity of the negative signal wave, it being understood however, that the increases and decreases in intensity of the signal wave pass through the intensities indicated by broken lines *x—x* and *y—y*. But when the secondary windings of one of the transformers is reversed, as stated above, the impulses produced in one of the secondary windings will likewise be reversed, such as shown in curve *b* by the impulses designated 12′ which are produced by the negative signal waves of two or more impulses in length.

Fig. 2 is a modification of Fig. 1 wherein the voltage impulses of negative polarity produced in transformers 11 and 12 are utilized to effect correction, and the positive impulses are practically eliminated. This is accomplished by connecting a vacuum tube amplifier 51 intermediate the secondary windings of transformers 11 and 12 and receiving distributor 13 and by providing in the grid circuit of such tube a high resistance 52. The high voltage impulses occur in the secondary windings in the manner hereinbefore described. The voltage drop effected in the impulses of positive polarity is considerable and in such direction as to make the grid of tube 51 negative with respect to the filament, whereas the voltage drop encountered by the negative impulses is in such direction as to make the grid positive with respect to the filament. The negative impulse is therefore effective to produce the correction impulses which are applied over the segments of receiving distributor 13 to the correction circuit, shown diagrammatically by block 53, which is identical with that shown in Fig. 1 and described above.

In Fig. 2—A which is a graphic representation of the operation of the circuit shown in Fig. 2, curve *c* corresponds to curve *a* of Fig. 1—A and curve *d* represents the impulses as impressed on the grid of tube 51. It will be noted in Fig. 2 that the secondary windings of transformers 11 and 12 are reversed with respect to the secondary windings of transformers 11 and 12 shown in Fig. 1 and in this way the negative impulses which effect correction are produced at the beginning of the signal wave regardless of the polarity of the signal. In curve *b* of Fig. 1—A the voltage impulses represent those produced in the secondary windings, whereas curve *d* represents the the secondary voltages as impressed on the grid of vacuum tube 51 wherein secondary voltages of positive polarity are made practically ineffective by high resistance 52.

Fig. 3 is another modification of Fig. 1 wherein a vacuum tube 61 inserted between transformers 11 and 12 and receiving distributor 13, serves as a negative "C" modulator having connected in its input circuit through transformer 62 an oscillator 63 comprising vacuum tube amplifier 64. The secondary windings of transformers 11 and 12 are arranged the same as those shown in Fig. 1 to produce positive impulses at the beginning of each signal wave. As each impulse occurs, a series of oscillations occur in the output circuit of tube 61. These oscillations are applied through transformer 65 to the receiving distributor 13, the transformer 65 serving to eliminate the direct current component of the output current. Each group of oscillations is impressed over the correction circuit shown diagrammatically in block 53, which is identical with that shown in Fig. 1 and described above, the oscillations being rectified in the correction circuit in order to effect the necessary correction.

Fig. 3—A graphically represents the operation of the circuit shown in Fig. 3. Curve *e* represents the signal current wave in the input circuit of transformers 11 and 12. Curve *f* represents the voltage impulses produced by the signal wave of curve *e* in the secondary windings of the transformers, whereby the impulses produced at the beginning of the wave, are positive in polarity. Curve *g* represents the oscillations occurring in the output circuit of tube 61 in response to voltage impulses being impressed on the input circuit. Curve *h* represents the rectified current impulses necessary to effect correction.

Fig. 4 is a modification of Fig. 3 wherein a modulator tube 71 together with its output circuit serves also as an oscillator. The voltage impulses produced in the secondary windings of transformers 11 and 12 are effective to produce in the output circuit a series of oscillations which are impressed on the grid of vacuum tube amplifier 72 wherein they are amplified and impressed through transformer 73 on to receiving distributor 13. They are then rectified and impressed upon the correction tubes as hereinbefore described, block 53 diagrammatically representing the correction circuit, vacuum tube tuning fork and indicating circuit arrangement shown in Fig. 1.

The operation of the circuit arrangement shown in Fig. 4 is graphically the same as that shown in Fig. 3—A.

Fig. 5 is another modification of Fig. 1 wherein the correcting tubes are employed as modulators instead of a variable reactance coil such as shown in Fig. 1, and a two-position relay 83 is used to receive the signals instead of the two transformers 11 and 12, although the transformers may be used to produce the correcting impulses. The arrangement shown in this figure provides what might be called a phase modulation method wherein unbalanced fork frequency currents, produced by a loss of phase position in the correcting distributor with respect to the sending distributor, are superimposed 180° out of phase with the normal driving phase on the fork driving current to effect the necessary correction. The impulses received in relay 83 cause at each crossover from positive to negative polarity and vice versa, a positive impulse to be impressed through receiving distributor 13 on to the grids of vacuum tubes 85 and 86 in quick succession. This is accomplished by momentarily opening the normally closed circuit extending over either of the relay contacts to battery 87 and permitting during the open intervals a positive potential to be impressed on the tubes 85 and 86 as brush 14 rotates from one segment to the next. When the correcting distributor 13 is in phase with the transmitting distributor half of each positive impulse from battery 87 will be applied equally over adjacent segments to the grids of tubes 85 and 86 and will therefore cause equal currents, both direct current and alternating fork frequency, to flow in the plate circuits thereof. The plate circuits respectively extend through the upper windings of transformers 81 and 82 to the indicating meter 88 and then over a common path from the meter, through a secondary winding 89 of transformer 90, conductor 91, back to the filaments of tubes 85 and 86. The lower windings of transformers 81 and 82 which form a part of a vacuum tube vibrating fork circuit, are connected in series across the grids of relay drive vacuum tube 92 and fork drive vacuum tube 93. Tubes 92 and 93 are connected in parallel in the output circuit of a pick-up vacuum tube 94 which is operated in response to the vibrations of vibrating fork 95. Tube 93 has also impressed upon it the in-phase or reversed phase fork frequency from the lower winding of transformers 81 and 82. The vibrations set up by the fork in its own magnetic field cause an alternating current in the winding of pick-up coil 96, which is impressed on the grid of vacuum tube 94. The output voltage of vacuum tube 94 is divided over three parallel paths. One path extends over a secondary winding 89 of transformer 90 to meter 88 where the alternating and direct voltages are then impressed equally on the plate circuits of tubes 85 and 86. The other two paths which include another secondary winding 98 of transformer 90, divide at the grid of tube 92. One of the latter paths extends through tube 92, transformer 99 and the windings of motor relay 100 whereby the relay is operated at the frequency of the fork to maintain a phonic wheel motor 101 at a speed dependent on the fork frequency. The other of the paths dividing at the grid of tube 92, extends through the lower windings of transformers 81 and 82, tube 93, transformer 102 and the winding of a drive magnet 103, whereby the output voltage of tube 93 is employed to maintain the fork in vibration.

Should the correcting distributor 13 lose phase with the transmitting distributor, unequal direct and fork frequency currents will flow in the plate circuits of tubes 85 and 86 and through the upper or differential windings of transformers 81 and 82. The difference in fork frequency currents will be induced in the lower or series connected windings of transformers 81 and 82 and thereby alter the voltage impressed on tube 93. The amplitude of vibration of fork 95 is therefore increased or decreased depending upon the nature of the change effected in the input to tube 93, and the frequency of the fork depends upon its amplitude.

Fig. 6 is a modification of Fig. 5 wherein rectifier vacuum tubes 111 and 112 are used in conjunction with correcting vacuum tubes 113 and 114 in the same manner as the corresponding tubes in Fig. 1 described above, but instead, of having the voltages set up by the vibrating fork, impressed on the plate circuits of the correcting tubes 113 and 114, these voltages are applied with equal effect to the grid circuits thereof through condensers 116 and 117, respectively. The grids of tubes 113 and 114 are made normally negative so as to prevent rectification of the voltage impulses set up by the fork. Otherwise the circuit operates in the same manner as that shown in Fig. 5.

Fig. 7 is another modification of Fig. 5 wherein only one tube is used for furnishing the correcting impulses. It will be noted that the correcting distributor 13 has its segments arranged in two groups, one of which is connected with the signal tube 131 and the other is left dead. This arrangement differs from the differential correction arrangement shown in Figs. 1 to 6 in that correction is effected not only by the average position of the correction impulse with respect to the correction brush 14, but also by the number of corrections as well. The correction is continued until the area of correction impulses on the correction segments returns to its average. When the armature of impulse relay 83 moves from one contact to the other in response to a change of polarity in the incoming signals, a positive impulse is impressed on the grid of vacuum tube 131 over the live segments of correcting distributor 13 and through condenser 132 of large capacity. The positive impulse is rectified or trapped on the grid as a negative voltage which leaks slowly off through resistance 137. The phase position of the brush with respect to the incoming signals determines the amount of negative voltage on the grid and therefore the amount of space current flowing to the plate of tube 131. When the correcting distributor 13 is in phase with the transmitting distributor the value of inductance produced by the space current flowing through the upper windings of transformers 81 and 82 is at a definite amount and any variations from this amount will vary the impedance of a circuit including the other or lower windings of these transformers, the latter windings of transformers 81 and 82 are included in the input circuit of vacuum tube 134 which is employed to drive the vibrating fork 95 and one of these windings is also connected to the output circuit of vacuum tube 135 which is operated by the pick-up coil magnet 96. When the vibrating fork 95 is vibrating at its normal frequency the impedance of the circuit including the output of tube 135, the lower winding of transformer 82 and the input of tube 134, is at a constant value, but this impedance when varied by any variation in the space current of tube 131 causes a corresponding variation in the potential applied to the grid of tube 134 which in turn varies the amplitude of vibration of fork 95 and in this way its rate of vibration. The operation of the motor relay 100 follows the fork frequency. Resistance 136 serves as a path for condenser 132 whereby a potential may be applied to the grid of tube 131 when the brush is on a dead segment. Transformers 81 and 82 may be replaced by a single transformer having a mid-tap in the lower winding.

Fig. 8 is another modification of Fig. 5 wherein a vacuum tube is used to modulate the current furnished to the drive magnet 103 and the motor relay 100. The employment of a vacuum tube as a modulator allows the use of low correcting voltages, but entails the floating of the correcting tubes 151 and 152 on the tubes of the vibrating fork system. The differential correction arrangement is employed in this figure. While the armature of relay 83 is passing from one contact to another, positive potential from battery 153 is applied over the segments of correction distributor 13 to correcting tubes or rectifiers 151 and 152. When the correcting distributor is in phase with the transmitting distributor the rectified current of tubes 151 and 152 will be equal and therefore cancel each other in the circuit including the plate of tube 151, winding 154 of transformer 155, grid and filament of modulator tube 156, conductor 157, and plate of tube 152. But when the distributors are out of phase with each other, the plate currents in tubes 151 and 152 will be unequal and the difference will be applied to the grid of tube 156 to vary its impedance and therefore the alternating current flowing through the winding 158 of transformer 159. This variation in current has a corresponding effect on the current flowing through fork drive vacuum tube 160, transformer 161, the drive magnet 103, thereby changing the amplitude of vibration of fork 95. The frequency of the fork depends upon the amplitude of vibration, and the operation of motor drive relay 100 follows the frequency of the fork.

Fig. 8—A shows the operation of the circuit arrangement of Fig. 8. Curve *i* represents a total voltage wave produced by rectifier tubes 151 and 152 when the motor 101 of the corrector distributor 13 is running first faster and then slower than the motor of the transmitting distributor at the distant station before synchronous phase is established. Curve *j* represents the output voltage wave of the pick-up tube 94, which when impressed on the input circuit of the modulator tube 156, is modulated by the slowly varying voltage shown in curve *i*. Curve *k* shows the output current of the modulator tube. Curve *l* shows the output current of the fork drive tube 161, which operates the drive magnet 103.

What is claimed is:

1. A system for synchronizing an oscillatory fork with a series of incoming impulses which comprises instrumentalities for producing a series of correcting impulses corresponding to changes of polarity of the incoming impulses, and means including correcting circuits whereby each of said series of impulses produces an effect upon said fork which is nil, acceleratory or deceleratory in a manner proportional to and depending upon the phase relation of said fork with respect to said produced impulses.

2. A system for synchronizing an oscillatory device with a series of incoming impulses which comprises instrumentalities for producing a plurality of correcting impulses for each change in polarity of the incoming impulses and means including correcting circuits whereby either impulse of said plurality of impulses produces an effect upon said device which is nil, acceleratory or deceleratory in a manner proportional to and depending upon the phase relation of said device with respect to said produced impulses.

3. A system for synchronizing an oscillatory fork with a series of incoming impulses which comprises instrumentalities for producing a series of correcting impulses corresponding to changes in polarity of the incoming impulses, and means for applying said impulses to circuits including two differentially related vacuum tube elements connected to a magnetic core whereby the inductance of said core is controlled by the difference of the effects produced on said elements by said series of impulses, and connections between said fork and said core whereby the variation of magnetic condition of said core controls said fork in a continuously proportional manner.

4. A system for effecting differential control comprising two paths for supplying impulses, two rectifying tubes respectively connected to said sources, a condenser charged in accordance with the differential effect of rectified current supplied by said tubes, a pair of vacuum tubes having their grid circuits differentially controlled by the charge in said condenser, and a device differentially controlled by the anode circuits of said tubes.

5. A system in accordance with the foregoing claim in which a source of impulses with which a device is to be synchronized is connected to a series of segments with alternate segments connected to one of said paths, and the remaining segments connected to the other of said paths.

6. In a correcting circuit for a synchronous system, means for producing two short voltage impulses of opposite polarity in response to each received signal wave, the first impulse of each wave being of one polarity regardless of the polarity of the signal wave, a rotary distributor for receiving said impulses, an electromagnetic device, a motor for driving said distributor and a continuously vibrating tuning fork for controlling the speed of said motor, the method of correcting said rotary distributor for slight departures from synchronism, which consists in splitting each of said impulses into two parts, rectifying said parts, and utilizing said parts in separate windings differentially arranged on the electromagnetic device, to neutralize each other when the two parts are equal, but to vary, when the two parts are unequal, the power supplied to the vibrating fork whereby the frequency of the fork is increased or decreased as desired.

7. In a synchronous system, a continuously correcting circuit comprising means for producing short voltage impulses from received signal waves, a rotary distributor and means for causing said voltage impulses to correct said rotary distributor for slight departures from synchronism, characterized in this, that it comprises a device of impedance variable by infinitesimal increments, two electron discharge devices having input circuits connected to successive segments of the rotary distributor to which said voltage impulses are applied and having output circuits respectively including windings differentially arranged on said electromagnetic device, a motor for driving said distributor, a vibrating fork for controlling the speed of said motor, and a plurality of circuits inductively associated with said device and respectively including means for driving said fork and means for driving said motor whereby any unbalanced currents in the output circuits of said electron discharge devices are utilized to vary the operation of both of said driving means simultaneously in the same direction.

8. In a synchronous system, a correcting circuit comprising means for producing short voltage impulses from received signal waves, a rotary distributor, and means for causing said voltage impulses to correct for slight departures from synchronism of said rotary distributor characterized in this, that it comprises two vacuum tube rectifiers having input circuits connected to successive segments of the rotary distributor to which said voltage impulses are applied, other vacuum tubes respectively connected to said rectifiers and having their output circuits including differential windings on an electromagnetic device, a motor for driving said distributor, a vibrating fork for controlling the speed of said motor and a circuit including a driving magnet for said fork and a winding on said device whereby any unbalanced currents in the output circuits of said vacuum tubes are utilized to vary the power supplied to the driving magnet circuit to thereby increase or decrease the frequency of said fork.

9. In a synchronous system, a correcting circuit comprising means for receiving signal waves of positive and negative polarity and repeating each of said waves as two voltage impulses, the impulses occurring at the beginning of the waves being of one polarity and those occurring at the end of the waves being of the other polarity, a rotary distributor for said voltage impulses of one polarity, two electron discharge devices having input circuits connected to successive segments of said rotary distributor, an electromagnetic device having windings differentially connected to the output circuits of said electron discharge devices, a motor for driving said distributor, a vibrating fork for controlling the speed of said motor, and a plurality of circuits inductively associated with said electromagnetic device and respectively including means for driving said fork and means for driving said motor whereby any unbalanced currents in the output circuits of said electron discharge devices are utilized to vary the power supplied to the vibrating fork to thereby increase or decrease the speed of said motor.

10. In a synchronous telegraph system, a continuously correcting circuit comprising means for receiving signal waves of positive and negative polarity and repeating each of said waves as two voltage impulses, the impulses occurring at the beginning of the wave being of one polarity and the impulses occurring at the end of the wave being of the other polarity, an electromagnetic device, a rotary distributor for receiving and distributing said voltage impulses, two vacuum tube rectifiers having input circuits connected to successive segments of said rotary distributor, a motor for driving said distributor, an instrumentality for controlling the speed of said motor, the circuits of said tubes being differentially connected to said electromagnetic device, and means whereby any unbalanced effect of currents in the circuits of said tubes are effective upon said instrumentality to control the speed of said motor.

11. In a telegraph system, a continuously correcting circuit comprising means for receiving signal waves of positive and negative polarity, a rotary distributor controlled by a local device, means for synchronizing said device with the incoming message signal impulses comprising correcting means operating under the influence of said rotary distributor, and means for indicating excessive departure of said rotary distributor from synchronous phase simultaneously with the synchronizing of said local device.

12. In a telegraph system, according to claim 11, wherein the indicating means comprise a recording and an audible device.

13. In a synchronous system, a correcting circuit comprising means for receiving signal waves of positive and negative polarity and repeating each of said waves as two voltage impulses, the impulses occurring at the beginning of the wave being of one polarity and those at the end of the wave being of the other polarity, a rotary distributor for receiving and distributing said voltage impulses, two electron discharge devices having input circuits connected to said rotary distributor and arranged to receive parts of said impulses, an electromagnetic device having windings differentially connected to the output circuits of said electron discharge devices, a motor for driving said distributor, a vibrating fork for controlling the speed of said motor, a vacuum tube circuit arrangement for maintaining the vibrating fork in continuous operation, and a plurality of circuits inductively associated with said electromagnetic device and respectively including means for drivng said fork and means for driving said motor whereby any unbalanced currents of the output circuits of said electron discharge devices are utilized to vary the output of said vacuum tube circuit arrangement to thereby increase or decrease the frequency of said fork.

14. A corrector system comprising the combination of a telegraph line, a rotary distributor, corrector means associated with said distributor, a pick-up relay for controlling said corrector means, and a saturated transformer connecting said pick-up relay and said distributor to said line.

15. A corrector system comprising the combination of a telegraph line, a rotary distributor, a pick-up relay, and a saturated transformer, said transformer being connected to said line and having said rotary distributor and said pick-up relay connected in series in the secondary circuit thereof, and a corrector mechanism controlled by said pick-up relay.

16. A corrector system comprising the combination of a telegraph line, a rotary distributor, corrector means associated with said distributor, a pick-up relay for controlling said corrector means, a saturated transformer for associating said pick-up relay and said distributor with said line for initiating operation of said corrector means when said distributor is out of synchronism with signals transmitted over said line, and means for maintaining said corrector means energized until the correcting operation is completed.

17. A corrector system comprising the combination of a telegraph line, a rotary distributor, a pick-up relay comprising a space discharge tube, corrector means operated by said pick-up relay, and a saturated transformer for connecting said rotary distributor to said line through the input circuit of said pick-up relay.

WILLIAM A. KNOOP.